Feb. 28, 1956     B. E. RICKS     2,736,581
ADJUSTING SLEEVE
Filed April 6, 1951
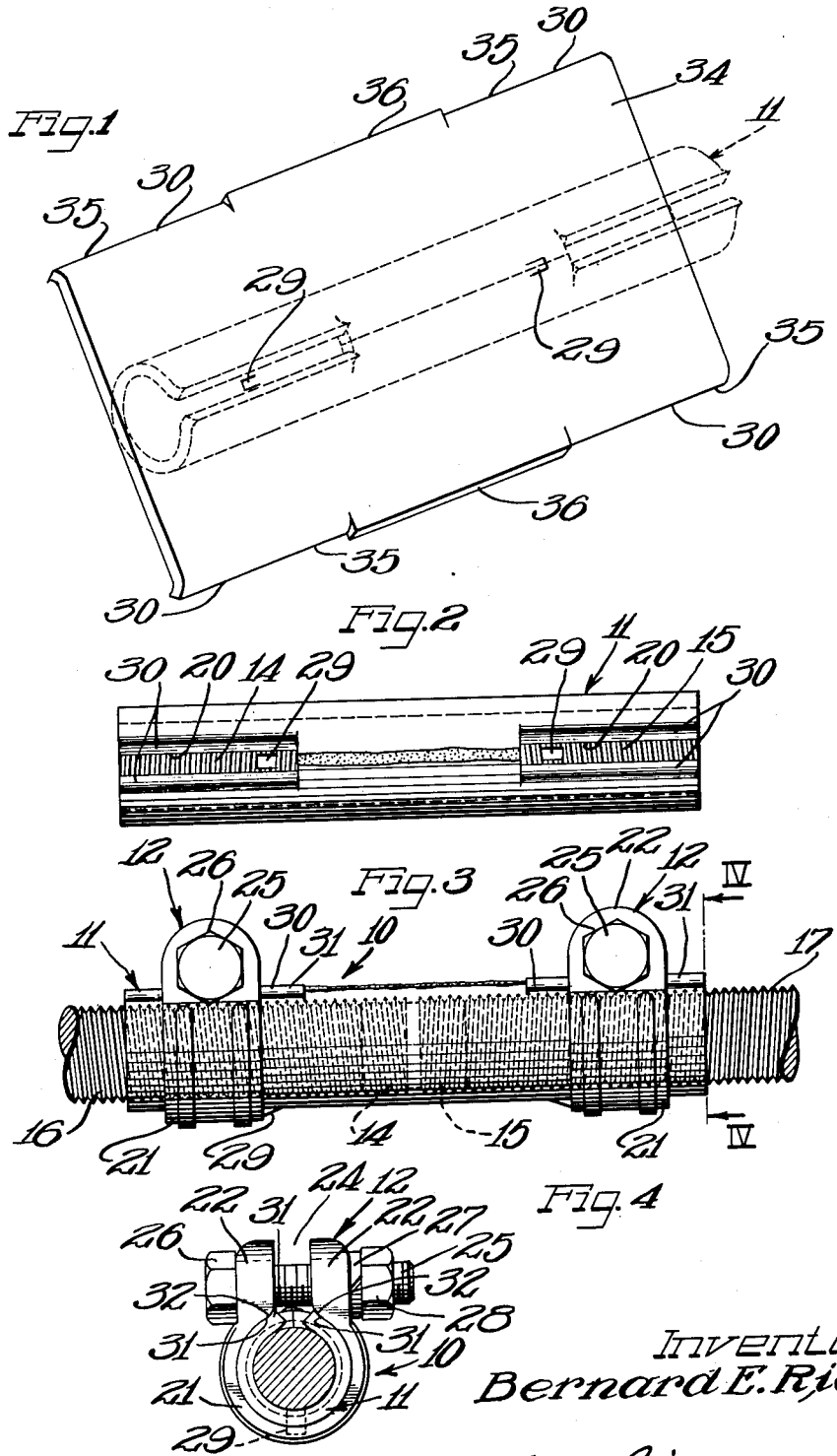
Inventor:
Bernard E. Ricks United States Patent Office 2,736,581
Patented Feb. 28, 1956

2,736,581

ADJUSTING SLEEVE

Bernard E. Ricks, Detroit, Mich., assignor to Thompson Products, Inc., Cleveland, Ohio, a corporation of Ohio Application April 6, 1951, Serial No. 219,717

3 Claims. (Cl. 287—60)

The present invention relates to an improved adjusting sleeve or turnbuckle for use in connecting and adjusting the distance between the ends of two members. More particularly, the invention relates to an improved adjusting sleeve or tube assembly in which the sleeve or tube and a split clamp have cooperating portions in positive engagement for clamping the slotted end portion of the sleeve about two connected members.

Clamps shown in the prior art in use on conventional adjusting sleeves have been subject to frequent failure because of the substantial bolt torques required in order that the slotted end portions of the sleeves be pulled down sufficiently tight on the threads of the connected members. Ordinarily, this tendency has been corrected by employing heavier clamps and larger clamp bolts in order to increase the clamping capacity of the sleeve before failure occurs. However, such a procedure results in greater manufacturing expense and increased difficulty in performing the clamping operation and in adjusting the distances between the two connected members.

According to the present invention, the working leverage distance of each of the clamp bolts is substantially decreased by providing opposed ribs on each side of the sleeve end slots. A split clamp having opposed heel portions is inserted over a slotted end portion of the tube with the heels abutting the longitudinal ribs to coact therewith, in response to tightening of the clamp bolt, to narrow the tube slot. Thus, the working leverage distance of the clamp bolt, which in the conventional installation is substantially the distance from the axis of the bolt to the axis of the tube, has now been shortened to approximately the distance between the axis of the bolt and the raised ribs.

The adjusting sleeve of this invention may be expeditiously formed by rolling a flat sheet blank into the proper tubular configuration. Before rolling, the blank is formed into the proper pattern, including cutouts to form the slots with their longitudinal edges outwardly deformed to provide the ribs and including lanced kerfs to provide stop abutments to prevent movement of the clamps too far inwardly along the finished tube. When the blank has been rolled into proper tubular form, the abutted central edges may be fixedly secured as by welding, and then threads are formed in the internal surface, preferably with right-hand threads formed in one axial half of the tube and left-hand threads formed in the other half. The split clamping rings may be of any suitable design with opposed heels formed at the juncture of the bight portion and the ears arranged for conforming contact with the surfaces of the longitudinal ribs.

It is, therefore, an object of the present invention to provide an improved adjusting sleeve for use with a turnbuckle assembly or the like.

Another object of the invention is to provide an adjusting sleeve having slotted end portions and integral external ridges formed along the slots to form engagement abutments for the heels of split clamps inserted over the slotted end portions.

A further object of the invention is to provide an improved turnbuckle sleeve having means for shortening the leverage distance of clamp tightening means utilized with the sleeve in order to increase the effectiveness of the clamp.

Still another object of the present invention is to provide an improved adjusting sleeve assembly including means for substantially increasing the effectiveness of a clamping ring inserted over a slotted end portion of the tube and stop means to prevent movement of the clamp too far inwardly along the tube.

A still further object of the invention is to provide an easily and inexpensively formable adjusting tube assembly including integral means on the adjusting tube for increasing the effectiveness of a clamping ring to permit the use of a lighter and more inexpensive clamp.

Other objects, features and advantages of the present invention will be apparent from the following detailed description of one embodiment, by way of preferred example only, taken in conjunction with the accompanying drawings.

On the drawings:

Figure 1 is a perspective view of a formed substantially flat blank ready for rolling to form an adjusting tube according to the present invention with a rolled tube shown in dotted outline superimposed on the blank.

Figure 2 is a top plan view of an adjusting or turnbuckle tube formed from a blank as shown in Figure 1.

Figure 3 is a side elevational view of an adjusting tube assembly according to the present invention including fragmentary portions of the two adjustably connected members.

Figure 4 is a sectional view taken along lines IV—IV of Figure 3 with one connected member shown in section and the adjusting tube assembly shown in end elevation.

As shown on the drawings:

In Figure 3 is shown an adjusting sleeve or turnbuckle assembly 10 including an adjusting sleeve tube or turnbuckle barrel 11 and a pair of clamps 12. The interior surface of the sleeve or tube 11 is internally threaded, preferably with right-hand threads 14 in approximately one axial half of the tube and left-hand threads 15 in approximately the other half of the tube. Two connected members 16 and 17 are provided with external right-hand and left-hand threads, respectively, and are threadedly received within the respective threaded ends of the tube 11.

In order to permit contraction of the peripheries of the end portions of the tube 11 for fixedly clamping the connected members therein, longitudinal open-ended slots 20, 20 are formed in the tube end portions. The clamps 12 are inserted over the respective slotted end portions for contracting the peripheries thereof. These clamps may be of any suitable construction and herein each comprises an annular bight portion 21 and a pair of integral opposed radially outwardly extending spaced clamping ears 22, 22 formed at the peripheral ends of the bight portion 21 with a substantial gap or space 24 separating the ears. For narrowing the gap 24 and consequently contracting the periphery of the bight portion 21, a threaded adjustment bolt 25 with an integral head 26 at one end is inserted through aligned holes (not shown) formed through the clamping ears 22, and a lock washer 27 and an adjusting nut 28 are provided on the other end portion of the bolt.

For preventing movement of the clamp 12 too far axially inwardly along the tube 11, a radially outturned axially outwardly facing integral kerf or tab 29 is formed from the material of the tube 11 opposite each of the slots 20 and located axially between the slot ends close to the inward end. As shown in Figure 3, the axially inward edges of the clamps 12 may abut the outward face of the kerfs 29 to position the clamps axially on the tube.

According to the present invention, means are provided for positioning the clamps 12 radially on the slotted end portions of the tube and for substantially increasing the clamping effectiveness of the clamps in order to insure a more positive, non-rotating connection between the connected members 16 and 17 and the adjusting tube assembly 10. In the present instance, such means comprise a pair of integral longitudinal radially-outturned buttress ribs or ridges 30, 30 which are formed by curling the defining edge portions of each of the slots radially outwardly to afford outward reverse curvature abutment surfaces 31, 31. The ribs or lips 30 may be formed with lanced inward ends as shown in the drawings or with deformed transition inner end portions without lancing. Curved heels 32 are formed at the inner junctures of the clamp ears 22 with the peripheral ends of the bight portions 21. The widths of the clamp gaps 24 and tube slots 20 are arranged so that the curved heels 32 will be disposed in abutting, conforming relation against the reverse curvature outer rib surfaces 31.

When the clamp gaps 24 are narrowed by tightening the nuts 28 on the bolts 25, the heels 32 will coact with the ribs 31 to urge the opposed ribs toward one another to narrow the slots 20. Thus, the operating leverage distance of each of the bolts 25 is substantially shortened to the distance between the axis of the bolt to the ribs 31 instead of the distance between the axis of the bolt to the sides of the tube at 90° to the slot as in the ordinary adjusting tube assembly. Hence, a clamp of lighter material can be utilized together with a smaller bolt in order to achieve a proper clamping pressure. In addition, the clamping pressure is more evenly distributed since the slotted end portion of the tube is drawn tightly and evenly about the connected member instead of being applied mostly adjacent the sides of the clamp.

The adjusting tube 11 is preferably made from flat sheet or strip stock which is first formed into a blank 34 which may be shaped into the proper pattern by punch-press dies (not shown). In the blanking operation, the blank 34 is formed to the exact shape required for rolling about a mandrel or the like into the form of the finished tube as shown in the superimposed dotted portion of Figure 1. The ribs 30 and the kerfs 29 may also be formed in the blank before the tube is rolled therefrom. It will be noted that cut-outs or edge recesses 35 are formed along the side edges of each of the end portions of the blank 34, and these cut-outs form the slots 20 when the blank has been rolled into tubular shape with a pair of central portion side edges 36 in abutted relation. After the blank 34 has been rolled into tubular form, the abutted surfaces 36 may be fixedly secured as by welding and the ends may be tapped to form the threads 14 and 15 within the tube.

From the above description it will be readily apparent that the present invention provides a substantially improved adjusting sleeve assembly including an adjusting sleeve or turnbuckle barrel and cooperating clamping rings having abutting portions on the sleeve and the rings coacting to substantially increase the effectiveness of the clamps by shortening the working leverage distances through which the tightening means must operate. Thus, lighter, more inexpensive clamps may be utilized and, at the same time, the clamping efficiency will be increased. These beneficial results are achieved in a very simple tube and clamp assembly which can be inexpensively produced.

It will be understood that modifications and variations may be effected without departing from the scope of the novel concepts of the present invention.

I claim as my invention:

1. An adjusting sleeve assembly for adjustably clamping a pair of externally threaded members comprising an elongated internally threaded sheet metal tube having a longitudinal slot in each end portion, the tube wall defining the edge portions of each of said slots being radially outwardly bent to provide radially projecting longitudinally extending ribs along the sides of the slots, a split clamp disposed over each slotted end portion of the tube and having an arcuate bight portion with opposed spaced integral ears at the ends thereof forming heels at the juncture of the bight portions with the ears, said heels abutting said ribs on the faces thereof opposite from the respective slots, said tube having an integral stop formed on the outward surface of the tube opposite each slot and preventing axially inward movement of the clamps beyond the stops, and means for adjusting the distance between said clamp ears to contract the peripheral lengths of said clamps and draw the ribs of each slot together to thereby decrease the diameter of the slotted end portions of said tube whereby the slotted ends of said tube will be contracted by a drawing action into tight clamping engagement with respective externally threaded members threaded therein.

2. An adjusting sleeve assembly for adjustably clamping a pair of externally threaded members comprising an internally threaded one-piece sheet metal tube having a longitudinal slot in each end portion with the longitudinal edges thereof being bent radially outwardly to form longitudinally extending buttress ridges along the defining edge portions of the slots, a split clamping ring disposed over each of said end portions and each having opposed radially outwardly projecting spaced heels formed on each side of the clamp split, and means for adjusting the distance between said clamping ring heels, said heels coacting with said ridges to thereby decrease the diameter of each end portion to clamp said tube to said members by a drawing action in response to a decrease in the distances between the heels.

3. A clamping sleeve assembly comprising an internally threaded sheet metal tube for threaded cooperation with an externally threaded member, said tube having a longitudinal slot in one end portion and integral radially outwardly bent longitudinally extending ribs formed in said tube as the defining edge portions of said slot, a split clamping ring disposed over said end portion, and means for contracting said ring, said ring having radially outwardly projecting heel portions coacting with said ribs to force said ribs toward each other to decrease the diameter of the tube end portion as said ring is contracted to thereby clamp said tube to said member by a drawing action.

References Cited in the file of this patent

UNITED STATES PATENTS

| | | |
|---|---|---|
| 146,041 | Baker | Dec. 30, 1873 |
| 612,685 | Thorp | Oct. 18, 1898 |
| 1,785,870 | Marles | Dec. 23, 1930 |
| 2,165,920 | Burnip | July 11, 1939 |
| 2,227,648 | Hufferd | Jan. 7, 1941 |
| 2,340,300 | Booth | Feb. 1, 1944 |
| 2,340,301 | Booth | Feb. 1, 1944 |
| 2,417,741 | Dillon | Mar. 18, 1947 |
| 2,526,470 | Gauthier | Oct. 17, 1950 |